United States Patent
Draper

(10) Patent No.: US 6,189,341 B1
(45) Date of Patent: Feb. 20, 2001

(54) METHOD OF MAKING AN OPTICAL FIBER WITH DIGESTION OF RETRACTING PARTICLES ON THE PREFORM

(75) Inventor: Clifton Walk Draper, Hopewell, NJ (US)

(73) Assignee: Lucent Technologies Inc., Murry Hill, NJ (US)

(*) Notice: Under 35 U.S.C. 154(b), the term of this patent shall be extended for 0 days.

(21) Appl. No.: 09/306,531

(22) Filed: May 6, 1999

(51) Int. Cl.$^7$ .................................................. C03B 37/027
(52) U.S. Cl. .................................................. 65/404; 65/430
(58) Field of Search ............................ 65/421, 404, 430; 428/428

(56) References Cited

U.S. PATENT DOCUMENTS

| | | |
|---|---|---|
| 4,116,653 | * 9/1978 | Irven . |
| 4,184,860 | 1/1980 | Schneider et al. . |
| 4,443,239 | * 4/1984 | Biswas . |
| 4,589,725 | * 5/1986 | Dyott . |
| 4,888,101 | * 12/1989 | Adams . |

FOREIGN PATENT DOCUMENTS

| | | |
|---|---|---|
| WO 92 21629 | 12/1992 | (WO) . |
| WO 98 18733 | 5/1998 | (WO) . |

OTHER PUBLICATIONS

English language Abstract of JP 63117922, May 21, 1998.

* cited by examiner

*Primary Examiner*—John Hoffmann
(74) *Attorney, Agent, or Firm*—Mathews, Collins, Shepherd & Gould, P.A.

(57) ABSTRACT

In accordance with the invention, particle contamination in drawing optical fiber is reduced by coating the glass preform with a particle-digesting coating prior to introducing the preform into the induction furnace. At least the end of the preform should be coated and preferably all of the preform. When the preform enters the hot zone, the coating melts and digests refractory particles. The coating material and digested particles dissolve into the silica glass at a low surface concentration that does not substantially change the performance of the drawn fiber. The preferred particle-digesting coating is lithium tetraborate.

6 Claims, 3 Drawing Sheets

METHOD OF MAKING AN OPTICAL FIBER WITH DIGESTION OF RETRACTING PARTICLES ON THE PREFORM

FIELD OF THE INVENTION

This invention relates to methods for drawing optical fiber from glass preforms and, in particular, to a method for drawing fiber with reduced particulate defects.

BACKGROUND OF THE INVENTION

The most widely used method for making glass optical fiber involves the use of refractory material induction furnaces to heat a glass preform to fiber drawing temperature. A typical induction furnace for drawing silica fibers is described in R. A. Runk, "A Zirconia Induction Furnace For Drawing Precision Silica Waveguides", *Optical Fiber Transmission II Technical Digest* (TuB 5-1) (Feb. 22–24, 1977). The induction furnace uses a tubular susceptor of zirconia or other refractory material disposed within a radio frequency coil. After the susceptor is heated to a desired temperature of approximately 2100° C., a glass preform rod is introduced into the middle of the susceptor, known as the hot zone. The preform end is reflowed and a tip portion drops off, attached to a glass strand and permitting the drawing of fiber from the remaining reflowed end. The conventional zirconia draw furnace comprises an outer cylindrical beaker of fused quartz, an inner tube (susceptor) of zirconia and an insulating region therebetween filled with zirconia granules (grog).

Although this method has produced fibers for many years, there has been a persistent problem with particulate contamination of the fiber. Refractory particles can contaminate the fiber as it is drawn, weakening the fiber and causing breakage. The induction furnace, with its refractory susceptor and grog, is a significant source of refractory particles. Moreover facilities where such furnaces are used develop a small but nonetheless significant environmental concentration of such particles.

The standard approach to reducing particulate defects is to draw the fiber under cleanroom conditions. This approach, however, has been less than completely successful. One problem is that cleanroom conditions cannot be established in the critical drawing region where the molten glass is closely spaced with the particulate generating refractory material. Another is that even a minute concentration of refractory particles can present a contamination problem. Accordingly, there is a need for a new method of reducing particle-induced breakage in drawing optical fiber.

SUMMARY OF THE INVENTION

In accordance with the invention, particle-induced breakage in drawing optical fiber is reduced by coating the glass preform with a particle-digesting coating prior to introducing the preform into the induction furnace. At least the end of the preform should be coated and preferably all of the preform. When the preform passes through the hot zone, the coating melts and digests refractory particles. The coating material and digested particles dissolve into the silica glass at a low surface concentration that does not substantially change the performance of the drawn fiber. The preferred particle-digesting coating is lithium tetraborate.

BRIEF DESCRIPTION OF THE DRAWING

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
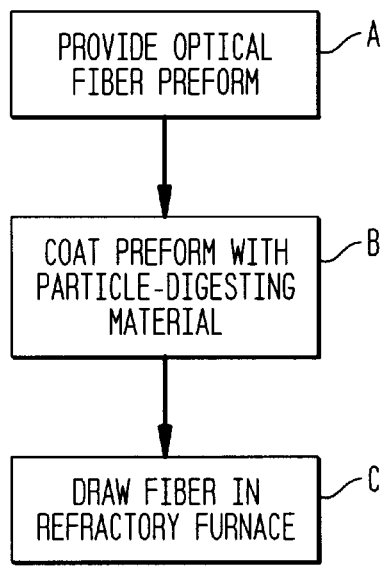
FIG. 1 is a schematic flow diagram of the steps in drawing an optical fiber in accordance with the invention.

Referring to the drawing, FIG. 1 is a flow diagram showing the steps for making optical fiber from an optical fiber preform in accordance with a preferred embodiment of the invention. As shown in block A of FIG. 1, the first step is to provide an optical fiber preform.

Figure 2A:
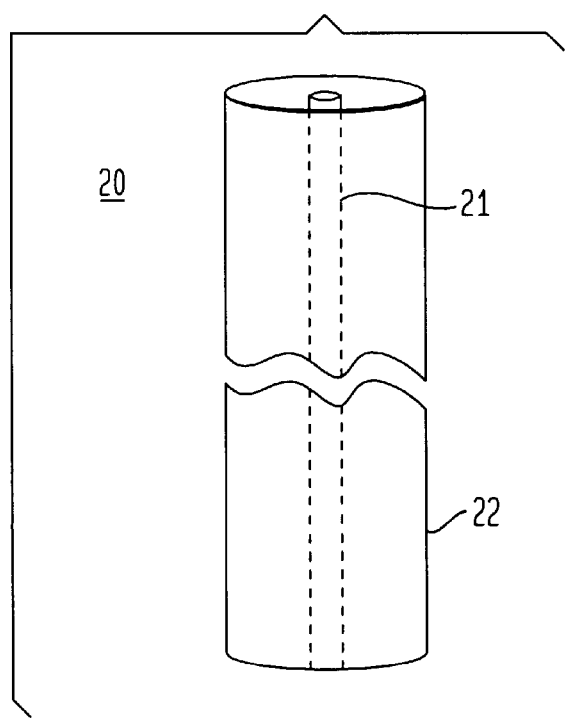
FIGS. 2A, 2B and 2C illustrate an optical glass preform at various stages of the process of FIG. 1.

FIG. 2A illustrates a typical preform 20 comprising a concentric glass rod having an inner core 21 of high purity, low loss glass and a concentric outer cylinder 22 of glass, referred to as cladding, having a lower index of refraction than the core. The rod typically has a length of about one meter and an outer diameter of 20–200 mm. The inner core has a diameter of about 1–5 mm.

The next step shown in block B of FIG. 1 is to apply to the preform, a coating of particle-digesting material. Coating can be by spraying, brushing or dipping.

The preferred particle-digesting materials are lithium borates such as lithium tetraborate ($Li_2B_4O_7$), lithium metaborate ($LiBO_2$) or mixtures thereof such as a mixture of 22 parts lithium metaborate to 12 parts lithium tetraborate. Alternative but less preferred particle-digesting materials include sodium tetraborate ($Na_2B_4O_7$) and sodium hexametaphosphate. The sodium containing materials are less desirable because of the potential for sodium to impart negative properties to the fiber. Other particle-digesting materials may be found among the fluxes for oxide particles used in silicate geology.

Preferably all of the preform is coated with the particle-digesting material. However a substantial benefit can be obtained even if only the end portion of the preform to be first introduced into the furnace is coated. The reason for this benefit is that the end of the preform hangs over the open draw furnace during the set-up and start of the draw process. As a consequence, the starting end glass is more highly contaminated. Furthermore, there is a tendency of refractory particles on the end of the preform to migrate up the preform surface as the underlying silica is evaporated. Thus coating the beginning portion of the preform can reduce particle contamination and break rates over fiber drawn from the entire preform.

Whether the coating is applied to the entire preform or to only the end portion, the coating is advantageously applied substantially uniformly around the circumference of the preform.

Figure 2B:
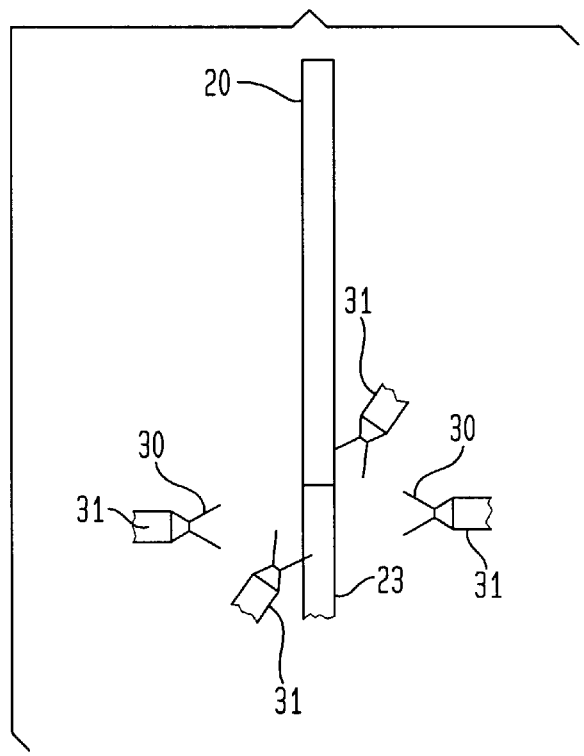

FIG. 2B illustrates a coating of particle-digesting material 30 being applied to the end portion 23 of a preform 20. The material 30 is preferably suspended in a volatile liquid and sprayed through a plurality of nozzles 31 arranged to apply a circumferentially uniform coating.

The third step (Block C) is to insert the preform (coated end first) into a refractory induction furnace and to draw fiber from the preform in the usual manner. The preform is lowered into the insulated susceptor of the induction furnace where it is heated to a high drawing temperature. Upon sufficient heating, a melted end portion bearing a glass strand drops, and the strand is inserted into a drawing station such as described in *Optical Fiber Telecommunications,* Ed. S. E. Miller and L. P. Kaminow, pp. 182–185 (Academic Press, 1988). The tension and draw rate are adjusted to draw a fiber of desired diameter.

Figure 2C:
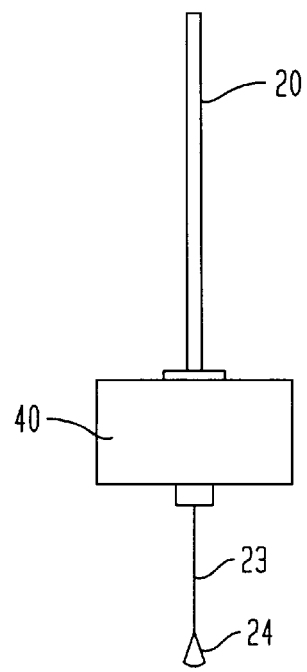

FIG. 2C illustrates the preform 20 inserted into a refractory draw furnace 40. A coated end portion 24 of the preform has dropped bearing fiber strand 23.

The coating 30 melts as the preform 20 passes through the high temperatures of the draw furnace. Refractory particles present on the preform are digested totally or to smaller size by the molten coating and underlying silica glass. Both the digested particles and the coating material dissolve into the silica glass surface as the fiber is drawn. The surface concentration of the coating material and digested particles dissolved in the glass is so low that it does not substantially change the performance of the drawn fiber.

Since fiber breaks during proof testing are in large part the result of refractory particle inclusions, the digestion of refractory particles significantly reduces proof test break frequency. Even when refractory particles are not completely digested, the reduction in refractory particle size by partial digestion reduces the break rate frequency. This is because the stress level needed to produce a proof test break scales with flaw size.

The invention can now be better understood by consideration of the following specific example.

EXAMPLE

A suspension of lithium tetraborate in methanol is prepared from a commercial source of lithium tetraborate (Spex CertiPrep Inc.). The particle sizes range from 100–700 micrometers. Alternatively, if a finer particle size suspension is desired, the suspension can be prepared using powder obtained from Aldrich Chemical Corporation, where the particle size is quoted as <20 micrometers. In both instances spectroscopic grade methanol was used as the suspension medium.

The suspension is sprayed onto the glass preform using a Campbell Hausfeld model DH5500 spray gun with the air pressure supplied by a Campbell Hausfeld model MT4110 air compressor.

A uniform coating is applied by holding the spray gun at a distance of approximately 2 feet, and slowly rotating the glass preform. The quantity of lithium tetraborate applied to the glass surface will vary depending on the concentration of the suspension, the distance maintained between the spray gun and the glass surface, and the spraying time. In this specific example, the spray time was 10 seconds, and the quantity of lithium tetraborate deposited was approximately 1 milligram per square inch.

To test the effect of the coating, refractory zirconia-yttria particles are applied to the same glass preform in a similar manner. The mean size of these particles is 2 micrometers, a size consistent with particles that induce factory type proof test failures. The refractory particle suspension is made with chloroform. In the absence of the lithium tetraborate, such particles cause severe strength issues during fiber drawing, as is well understood by those familiar with fiber production. These particles are essentially the test challenge for the lithium tetraborate. In the absence of the lithium tetraborate such an intentionally contaminated preform will yield extremely "brittle" fiber. Fiber that is difficult to spool and nearly impossible to proof test.

Figure 3:
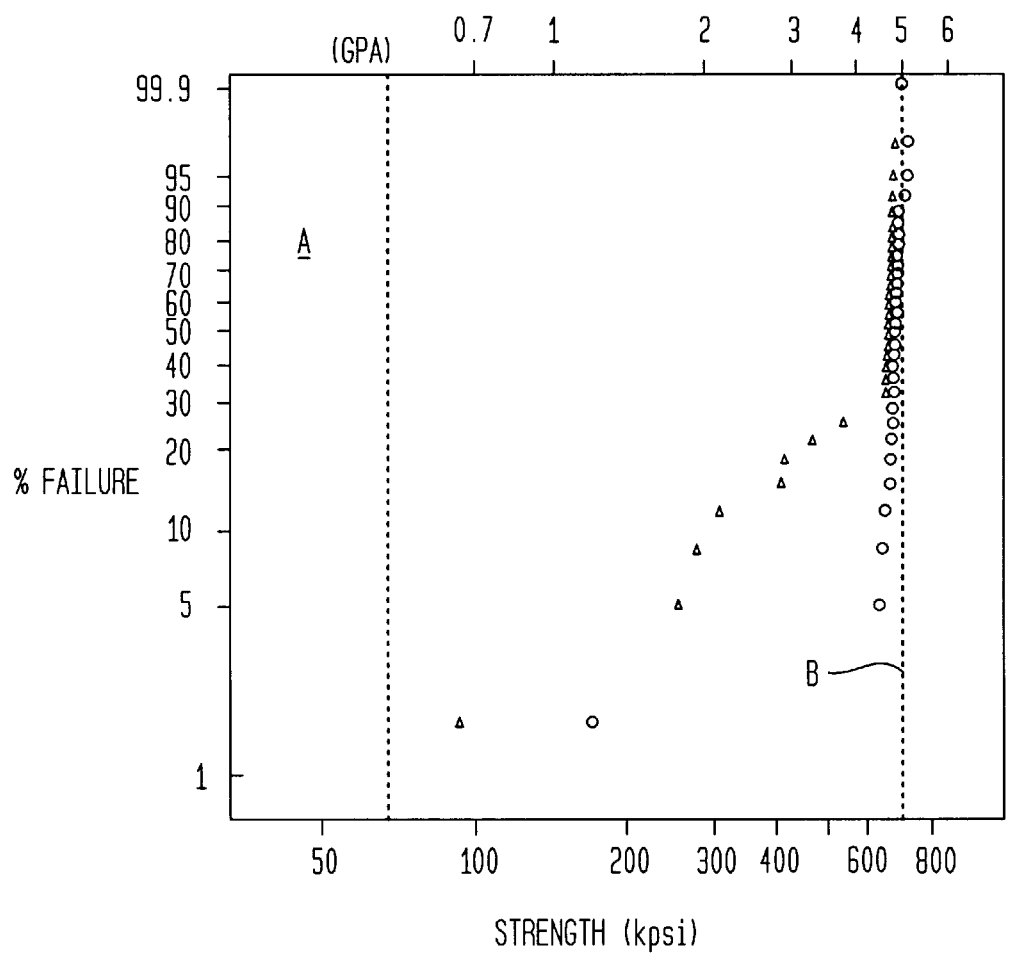
FIG. 3 is a graphical illustration showing the effect of the coating in preventing fiber breaks.

The presence of the lithium tetraborate coating allows for long lengths of fiber to be drawn, with on-line 100 kpsi proof test screening. FIG. 3 provides the Weibull plot strength data from two different spools (A and C) drawn from the specific example preform. Spool A was drawn with on-line 100 kpsi proof testing. Spool C was drawn without on-line proof testing. These are 31 sample, 20 meter gauge length evaluations. Failure strengths from one spool (Spool A) are shown as triangles. Failures from the other (Spool C) are shown as squares. Only one sample failed below 100 kpsi, and only two below 200 kpsi. These are typical proof test levels used to evaluate production fiber. In the absence of the lithium tetraborate coating this refractory particle intentional contamination will cause 100% of 20 meter gauge length fibers to fail well below 100 kpsi.

To illustrate the impact of the flux, a typical 50 cm gauge length result for fiber collected from an intentionally contaminated preform has been added to FIG. 3 as region A. All contaminated samples failed in the region at strengths less than the dashed line A. Again, to illustrate how close to standard high strength production fiber the flux can mediate the intentionally contaminated glass, a typical 20 meter gauge length result for non-contaminated fiber has also been added as line B. These are for illustrative purposes only, this data was not generated from the glass used in the specific example (spools A and C).

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. The method of making optical fiber comprising the steps of:

providing an optical fiber preform;

coating a circumferential portion of the preform with a refractory particle digesting material comprising a material selected from the group consisting of lithium tetraborate, lithium metaborate, sodium tetraborate and sodium hexametaphosphate; and drawing fiber from the coated preform in a refractory material draw furnace.

2. The method of claim 1 wherein the preform is coated by suspending particles of the refractory particle digesting material in a volatile liquid and spraying the suspension on the preform.

3. The method of claim 2 wherein the particles of refractory particle digesting material comprise particles of lithium tetraborate.

4. The method of claim 3 wherein the volatile liquid comprises methanol.

5. In an optical fiber preform comprising a glass rod having an inner core of glass and a concentric outer cylinder having a lower index of refraction than the core, the improvement wherein the outer surface of the preform is coated with a refractoy particle digesting material selected from the group consisting of lithium tetraborate, lithuim metaborate, sodium tetraborate and sodium hexametaphosphate.

6. The improved fiber preform of claim 5 wherein the refractory particle digesting material comprises lithium tetraborate.

* * * * *